March 22, 1955     M. B. EATON     2,704,443
BREAD SAVER
Filed Jan. 29, 1953
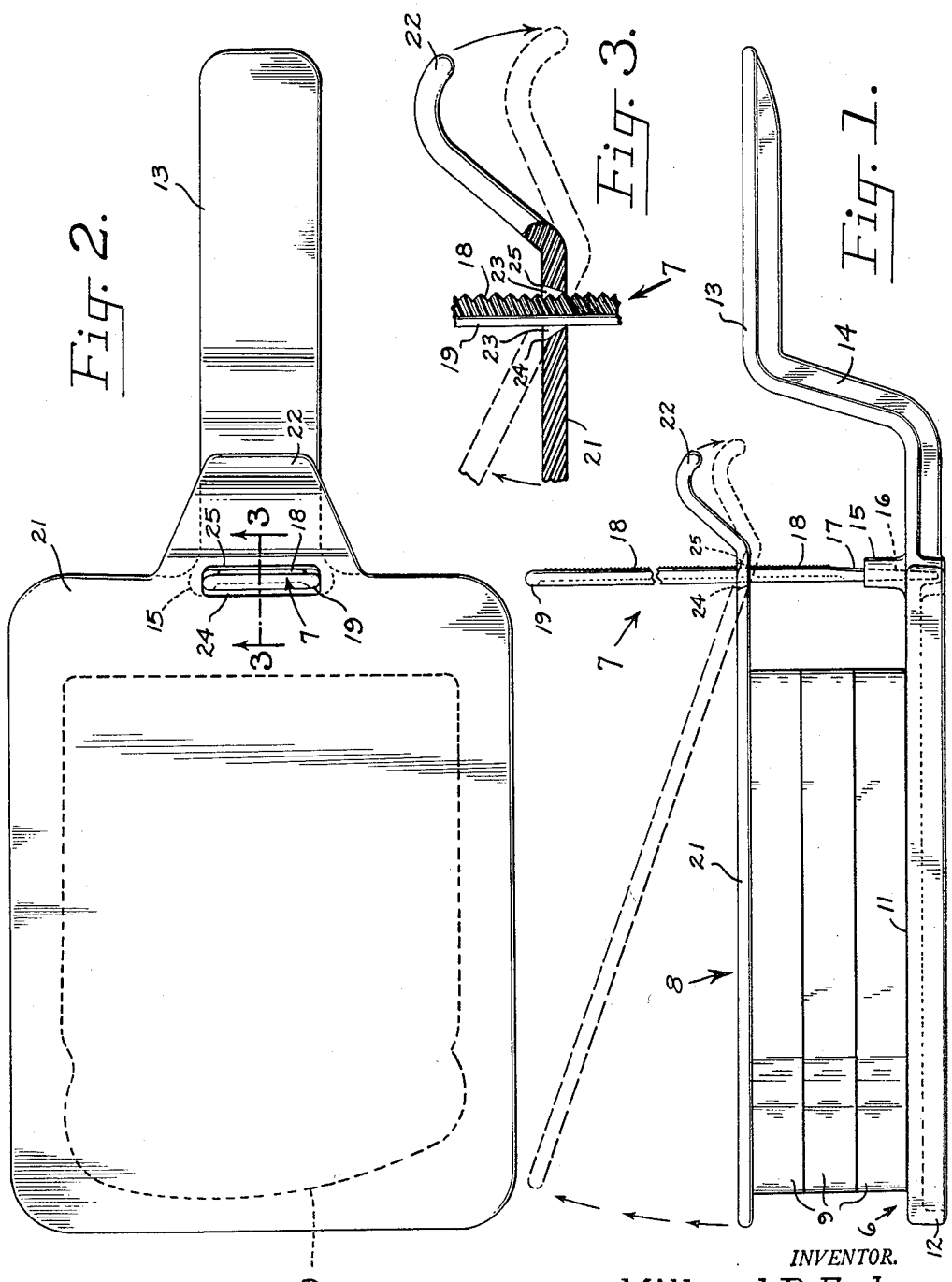
INVENTOR.
Millard B. Eaton
BY
Agent

United States Patent Office 2,704,443
Patented Mar. 22, 1955

2,704,443

BREAD SAVER

Millard B. Eaton, Roseburg, Oreg., assignor to Bek, Inc., Sutherlin, Oreg., a corporation of Oregon Application January 29, 1953, Serial No. 333,994

2 Claims. (Cl. 65—59)

This invention pertains to food serving devices, and relates particularly to a device for serving sliced bread.

The conventional procedure for serving slices of bread is to place the slices, either singly or in a stacked group, upon a plate. The inherent disadvantage of this procedure resides in the fact that the cut surfaces which are exposed to the atmosphere dehydrate rapidly and thus become stale. This action occurs within a very few minutes, and it is often the case that freshly served bread slices become dried and unappetizing before the diner has had opportunity to consume them.

Accordingly, it is the principal object of the present invention to provide a bread server which protects the cut surfaces of the slices against dehydration prior to consumption.

Another important object of this invention is to provide a bread server which is operated with maximum facility to expose a slice for selection and which automatically returns to proper position for protecting the slices remaining therein.

A further important object of this invention is the provision of a bread server which is readily disassembled for efficient cleansing.

A still further important object of the present invention is the provision of a bread server which is of simplified and therefore economical construction, and presents a pleasing appearance for display upon the table These and other objects and advantages of the present invention will appear from the following detailed description, taken in connection with the accompanying drawing, in which:

Figure 1 is a side elevation of a bread server embodying the features of this invention, the same being shown in dotted line in open position preparatory to removing a slice of bread therefrom;

Figure 2 is a top plan view of the bread server shown in Figure 1; and

Figure 3 is a fragmentary side elevation showing the pivot mechanism of the present invention, a portion thereof being shown in section taken along the line 3—3 in Figure 2, the action of the pivot mechanism being illustrated in dotted outline.

Referring particularly to Figure 1 of the drawing, the bread server of the present invention includes a base member 6, an upright guide member 7 supported by the base member and a cover member 8 slidably supported by the guide member. The slices of bread 9 to be served are placed between the base member and the cover member.

The elements of the bread server are shown in the drawing to be constructed of synthetic plastic material, such as a thermoplastic or thermosetting resin. It will be apparent, however, that other materials, such as metal or wood, may be used if so desired.

The base member 6 comprises a substantially rectangular plate section 11 preferably dimensioned slightly larger than the slices of bread 9 to be served therefrom. In the plastic construction illustrated the plate 11 is provided with a peripheral reinforcing rib 12 projecting downwardly therefrom and forming the base of the device.

The base member 6 also preferably includes a handle section 13 which extends outwardly from one end of the plate section 11, preferably along the longitudinal centerline of the latter. The handle section as shown in the drawing is offset upwardly intermediate its ends to elevate the hand gripping end thereof a convenient distance from the base. A reinforcing rib 14 is provided along the longitudinal center line of the handle section for purposes of enhancing the strength and rigidity of the latter.

A socket member 15 is also formed in the base member 6, preferably in the proximity of the junction of the handle section 13 with the plate section 11. This socket member is provided with an elongated cavity 16 which extends substantially normal to the plane of the plate section 11. The cavity is preferably tapered downwardly, as shown in Figure 1 of the drawing, for purposes explained in detail hereinafter. The cavity may terminate above the bottom end of the socket member, as illustrated, or it may extend completely through the socket member if so desired.

The upright guide member 7, shown foreshortened in Figure 1, comprises an elongated bar, the bottom end 17 of which is tapered to correspond with the taper of the socket member cavity 16, whereby the bar may be firmly but releasably secured to the base member 6. The surface of the bar facing away from the plate section 11, i. e. facing toward the handle section 13, is serrated transversely to form a plurality of teeth 18. This serrated section preferably extends from the taper of the bottom end 17 upwardly to a point adjacent the upper end of the bar. The surface of the bar opposite the serrated section is provided with a peripheral reinforcing rib 19.

The cover member 8 comprises the plate section 21, which is preferably dimensioned to be coextensive with the plate section 11 of the base member 6, and a handle section 22. The handle section extends outwardly from the end of the plate section 21 corresponding to the end of plate section 11 from which handle section 13 extends.

An elongated aperture 23 is formed in the plate section 21 adjacent the handle section 22. As best shown in Figure 3, this aperture is defined by edges 24, 25 which taper downwardly from the top surface of the cover plate to the bottom surface thereof. The width and length of the aperture is proportioned to slidably receive the guide member 7 therethrough. The edge 24 is disposed on the ribbed side 19 of the guide member and is preferably of greater slope than edge 25 which is disposed on the toothed side 18 of the guide member. This arrangement affords adequate upward pivoting of the cover plate section 21 to expose the top slice of bread 9 for convenient removal.

The operation of the bread server described hereinbefore is as follows: With the cover member 8 removed or elevated substantially above the base member 6, a desired number of slices of bread 9 are deposited in stacked relation upon plate section 11 of the base member. The cover member 8 is then permitted to slide downwardly along the guide member 7 until the cover plate section 21 rests flatwise upon the top slice of bread. The base plate section 11 and the cover plate section 21 thereby protect the bottom and top cut surfaces, respectively, of the stack of bread against dehydration. The baked edges of the slices are resistant to the dehydrating action of the atmosphere and therefore do not require protection.

The bread server, filled with slices in the manner described above, may now be carried by the handle 13 and placed upon the table. When it is desired to remove a slice from the server, the patron presses downwardly upon the handle 22, whereupon the bottom of edge 25 engages one of the adjacent transverse teeth 18 on the guide member 7, and thus the cover plate section 21 is swung upwardly, in a clockwise rotation in Figures 1 and 3, to expose the top slice of bread.

After removal of one or more slices from the stack, the patron releases his hand from the handle 22, whereupon the cover member 8 pivots in a counterclockwise direction until the edge 25 is released from the tooth 18. The cover member then slides downwardly until the cover plate section 21 rests flatwise upon the topmost slice of bread remaining on the server.

From the foregoing it will be seen that the present invention provides a bread server which is of simplified construction, attractive in appearance and operable with maximum facility and convenience.

Those skilled in the art will recognize that various changes may be made in the structural details described hereinbefore without departing from the scope and spirit of this invention. For example, the dimensions of the server may be varied within wide limits. The positions of the various elements, such as the handle sections 13 and 22, the socket member 15 and guide member 7, may also be changed if desired. The guide member 7 may be secured permanently to the base member 6. The device may be used to serve any type of food which, like bread, is customarily served in slices. It is to be understood, therefore, that the foregoing description is merely illustrative of the invention and is not to be construed in a limited sense.

Having now described my invention and the manner in which the same may be used, what I claim as new and desire to secure by Letters Patent is:

1. A serving device for sliced food, comprising a base member including a base plate section adapted to receive the sliced food thereon, a guide member secured to the base member and extending upwardly adjacent the base plate section, a cover member including a cover plate section and a handle section and having an aperture therein adjacent the handle section adapted to receive the guide member therethrough and to permit pivoting of the cover member relative thereto, the cover plate section being adapted to overlie the base plate section, tooth engaging means on the side of the aperture adjacent the handle section, and tooth means on the guide member on the side of the latter facing the handle section of the cover member, the tooth means being adapted to be engaged by the tooth engaging means as the cover plate section is pivoted upwardly away from the base plate section by downward movement of the handle section.

2. A serving device for sliced food, comprising a base member including a base plate section and an elevated handle section, the base plate section being adapted to receive the sliced food thereon, a socket member on the base member adjacent the handle section, a guide member releasably secured in the socket member and extending upwardly adjacent the base plate section, a cover member including a cover plate section and a handle section and having an aperture therein adjacent the handle section adapted to receive the guide member therethrough and to permit pivoting of the cover member relative thereto, the cover plate section being adapted to overlie the base plate section, tooth engaging means on the side of the aperture adjacent the cover plate handle, and tooth means on the guide member on the side of the latter facing the handle section of the cover member, the tooth means being adapted to be engaged by the tooth engaging means as the cover plate section is pivoted upwardly away from the base plate section by downward movement of the cover plate handle.

References Cited in the file of this patent

UNITED STATES PATENTS

| | | |
|---|---|---|
| 277,170 | Smith | May 8, 1883 |
| 571,041 | Dickinson | Nov. 10, 1896 |
| 1,037,788 | Maupin | Sept. 3, 1912 |
| 2,172,013 | Parry | Sept. 5, 1939 |
| 2,448,900 | Mayo | Sept. 7, 1948 |
| 2,533,577 | Godfrey | Dec. 12, 1950 |

FOREIGN PATENTS

| | | |
|---|---|---|
| 621 | Great Britain | Feb. 28, 1872 |